US012607486B2

(12) United States Patent
Fodor et al.

(10) Patent No.: US 12,607,486 B2
(45) Date of Patent: Apr. 21, 2026

(54) INDUCTIVE DISPLACEMENT SENSOR WITH A MOVEABLE MEASURING HEAD

(71) Applicant: Balluff GmbH, Neuhausen a.d.F. (DE)

(72) Inventors: Andras Fodor, Totvazsony (HU); Sandor Pali, Veszprem (HU)

(73) Assignee: BALLUFF GMBH, Neuhausen ADF (DE)

( * ) Notice: Subject to any disclaimer, the term of this patent is extended or adjusted under 35 U.S.C. 154(b) by 224 days.

(21) Appl. No.: 18/276,403

(22) PCT Filed: Feb. 15, 2022

(86) PCT No.: PCT/EP2022/053639
§ 371 (c)(1),
(2) Date: Aug. 8, 2023

(87) PCT Pub. No.: WO2022/171897
PCT Pub. Date: Aug. 18, 2022

(65) Prior Publication Data
US 2024/0118113 A1 Apr. 11, 2024

(30) Foreign Application Priority Data
Feb. 15, 2021 (DE) ...................... 10 2021 103 515.5

(51) Int. Cl.
*G01D 5/20* (2006.01)

(52) U.S. Cl.
CPC ..................................... *G01D 5/20* (2013.01)

(58) Field of Classification Search
CPC .............................. G01D 5/20; G01D 5/2046
See application file for complete search history.

(56) References Cited

U.S. PATENT DOCUMENTS

| | | | |
|---|---|---|---|
| 5,815,091 A | 9/1998 | Dames et al. | |
| 7,449,878 B2 * | 11/2008 | Lee ...................... | G01D 5/2053 |
| | | | 324/207.17 |
| 2003/0085700 A1 * | 5/2003 | Momose .............. | G01D 5/2046 |
| | | | 324/207.17 |
| 2003/0206007 A1 | 11/2003 | Gass et al. | |
| 2007/0001666 A1 | 1/2007 | Lee | |

(Continued)

*Primary Examiner* — Giovanni Astacio-Oquendo
*Assistant Examiner* — Haidong Zhang
(74) *Attorney, Agent, or Firm* — GableGotwals

(57) ABSTRACT

An inductive displacement sensor having a magnetically permeable measuring head arranged displaceably and/or rotatably on an elongated support, having at least one measuring loop with a geometric shape changing in response to longitudinal/rotational displacement of the measuring head along the support, and having at least one exciter loop by means of which a magnetic flux can be generated in the measuring head. At least two measuring loops being provided, the first measuring loop formed geometrically in such a way that a response, changing as linearly as possible, to a magnetic excitation of the measuring head emerges with a longitudinal/rotational displacement of the measuring head along the support and the least second measuring loop formed geometrically in such a way that a periodically changing response to a magnetic excitation of the measuring head emerges with a longitudinal/rotational displacement of the measuring head.

16 Claims, 11 Drawing Sheets

(56)                    References Cited

U.S. PATENT DOCUMENTS

2010/0175272 A1*    7/2010   Rudy ..................... G01B 7/003
                                                     33/708
2013/0057259 A1*    3/2013   Burkhardt ........... G01D 5/2457
                                                     324/207.11

\* cited by examiner

395

INDUCTIVE DISPLACEMENT SENSOR WITH A MOVEABLE MEASURING HEAD

CROSS-REFERENCE TO RELATED APPLICATIONS

This is the United States national phase application of PCT Application No. PCT/EP2022/053639 filed 15 Feb. 2022, which claims priority to German Patent Application No. DE 10 2021 103 515.5 filed 15 Feb. 2021, each of which is incorporated herein by reference.

The invention relates to an inductive displacement sensor according to the preamble of claim 1.

PRIOR ART

An inductive displacement sensor having a moveable or rotatable, magnetically permeable measuring head is described in US 2003/206 007 A1. The displacement sensor comprises at least one measuring loop whose geometric shape changes in response to the longitudinal/rotary displacement of the measuring head, and at least one exciter loop, by means of which a magnetic flux can be generated in the measuring head. The magnetic flux penetrates the at least one measuring loop at any point of the longitudinal/rotational displacement of the measuring head, essentially in the region of the measuring head, and induces an electric measuring signal. The measuring head has a passive resonant circuit which is formed as an outwardly electrically decoupled oscillating circuit and which is excited in correct phase relation by a short voltage pulse after a number of, preferably, 10 to 20 free oscillations.

DISCLOSURE OF THE INVENTION

The invention proposes an inductive displacement sensor relevant here having a moveable measuring head which, in contrast to the prior art, has at least two pairs of measuring loops, the geometric shape of which changes linearly or continuously with a longitudinal/rotational displacement of the measuring head. The measuring head additionally comprises at least one exciter loop, by means of which a resonant circuit, mentioned at the beginning, of the measuring head can be excited by generating a magnetic flux.

The first two measuring loops of the measuring loop pair are preferably formed triangularly and reflected symmetrically in relation to each other. It is thus achieved that, when the first measuring loop delivers an increasing electrical output signal, the other measuring loop respectively delivers a correspondingly decreasing output signal. The geometric shape and the position of the two measuring loops are here chosen in such a way that the sum of the output signals of the two measuring loops is substantially constant.

On the other hand, the two second measuring loops of the measuring loop pair have a geometric shape which is suitable for issuing a sinusoidal or cosinusoidal output signal when displacing the measuring head longitudinally/rotationally. The geometries of the two measuring loops are here substantially identical, yet arranged in such a way that one of the two measuring loops issues a sinusoidal output signal and the respectively other measuring loop delivers a cosinusoidal output signal when displacing the measuring head longitudinally/rotationally. The sinusoidal or cosinusoidal output signals preferably have a fixed phase shifting in relation to each other, whereby the geometries of the two measuring loops are repeated periodically.

Here, it can further be provided that the segments of a corresponding sine or cosine period of the second measuring loops of the measuring loop pair are repeated, in any range, preferably 100 mm.

The first preferably triangular measuring loop pair conveys the so-called "coarse displacement" of the measuring head, while the second sine/cosine measuring loop pair conveys the so-called "fine displacement" of the measuring head. The deflection of the measuring head measured in this way is thus made up of the measuring results of the coarse and fine displacement.

Said complete loop arrangement is depicted by way of example in FIG. 2*a.*

The proposed displacement sensor in particular has a hovering or floating measuring head and self-regulating functions and thus enables a measuring resolution in the submicron range.

In contrast to the prior art mentioned at the start, such a sinusoidal or cosinusoidal measuring loop pair for measuring the fine position of the measuring head is independent of the position of the measuring head and of the length of the measuring loop.

The displacement sensor proposed according to the invention, in particular the floating measuring head and the measuring loops, enable a completely digital processing or evaluation of the respective measuring signals by means of a digital evaluation circuit. An output value emerging in the evaluation is thus made up of the measuring signals of the triangular and the sinusoidal or cosinusoidal measuring loop pairs. The measuring signals are processed by means of a common ADC (analogue-digital converter) and by means of a digital circuit described below.

DETAILED DESCRIPTION OF THE EXEMPLARY EMBODIMENTS

Figure 1:
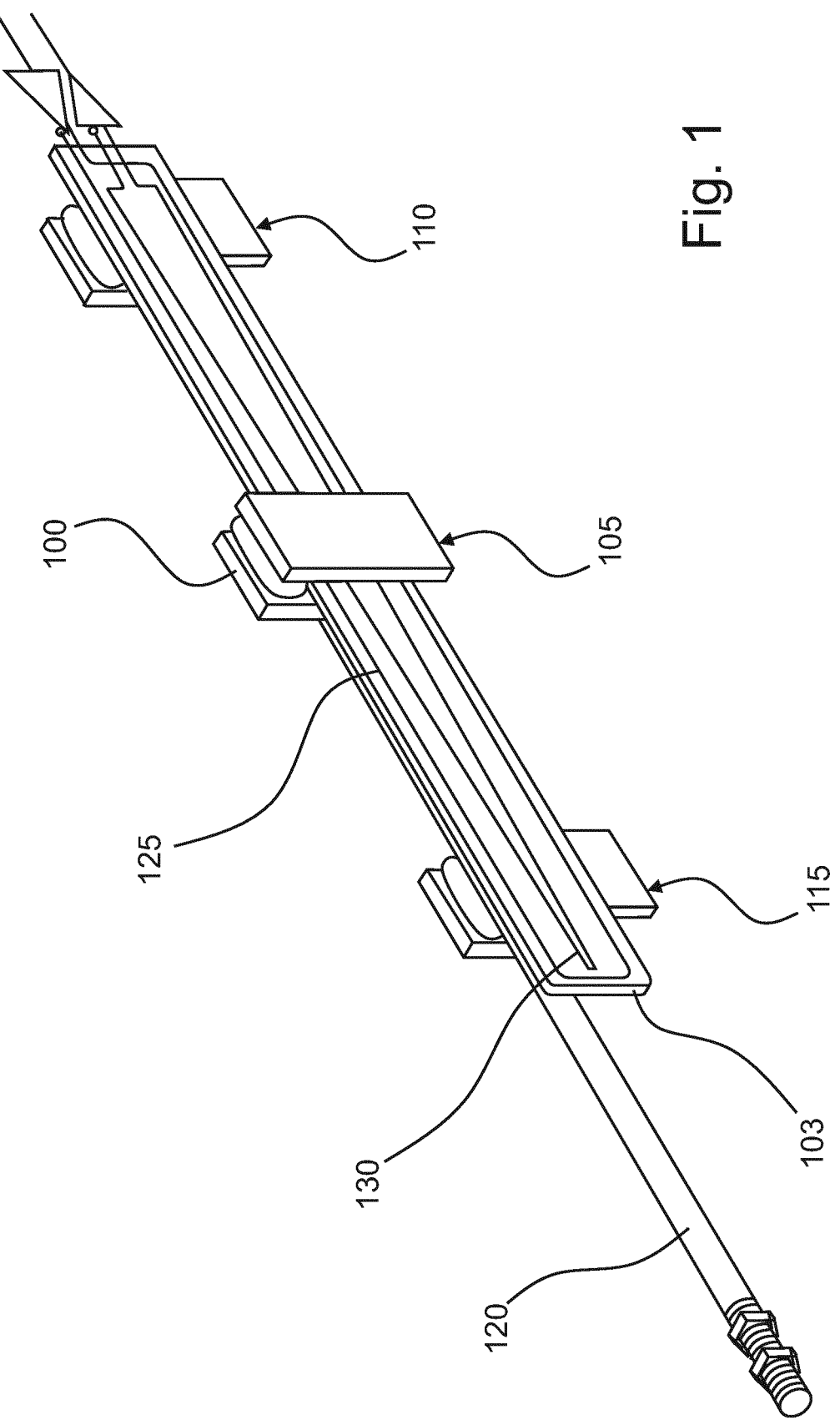
FIG. 1 schematically shows an isometric depiction of a displacement sensor according to the prior art.

The displacement sensor shown in an isometric depiction in FIG. 1 comprises a measuring head 100 arranged on an elongated support 103 and moveable in the longitudinal direction of the support 103. A passive oscillating circuit (not shown here) is arranged on the measuring head 100. In the scenario shown, the measuring head 100 is positioned in a central position 105 on the support 103. When it moves in the longitudinal direction, it can assume the further two positions 110, 115 only indicated.

In addition, when it moves in relation to the support 103, the measuring head 100 can be tilted, which corresponds to an additional rotational movement component not depicted here.

The measuring head 100 is rigidly connected to a push rod 120, such that the measuring head is correspondingly also moved in the event of a displacement of the push rod 120 in the longitudinal direction of the support 103. The displacement measuring of an object to be measured is thus carried out by means of the push rod 120 fixedly connected to the respective object.

A rectangular exciter coil 125 extending across the entire longitudinal direction of the support 103 is applied to the support 103, e.g. printed by means of the inherently known method of "imprint lithography". In addition, a triangular receiver coil 130 also extending across the entire longitudinal direction of the support 103 is applied to the support 103.

Figure 2A:
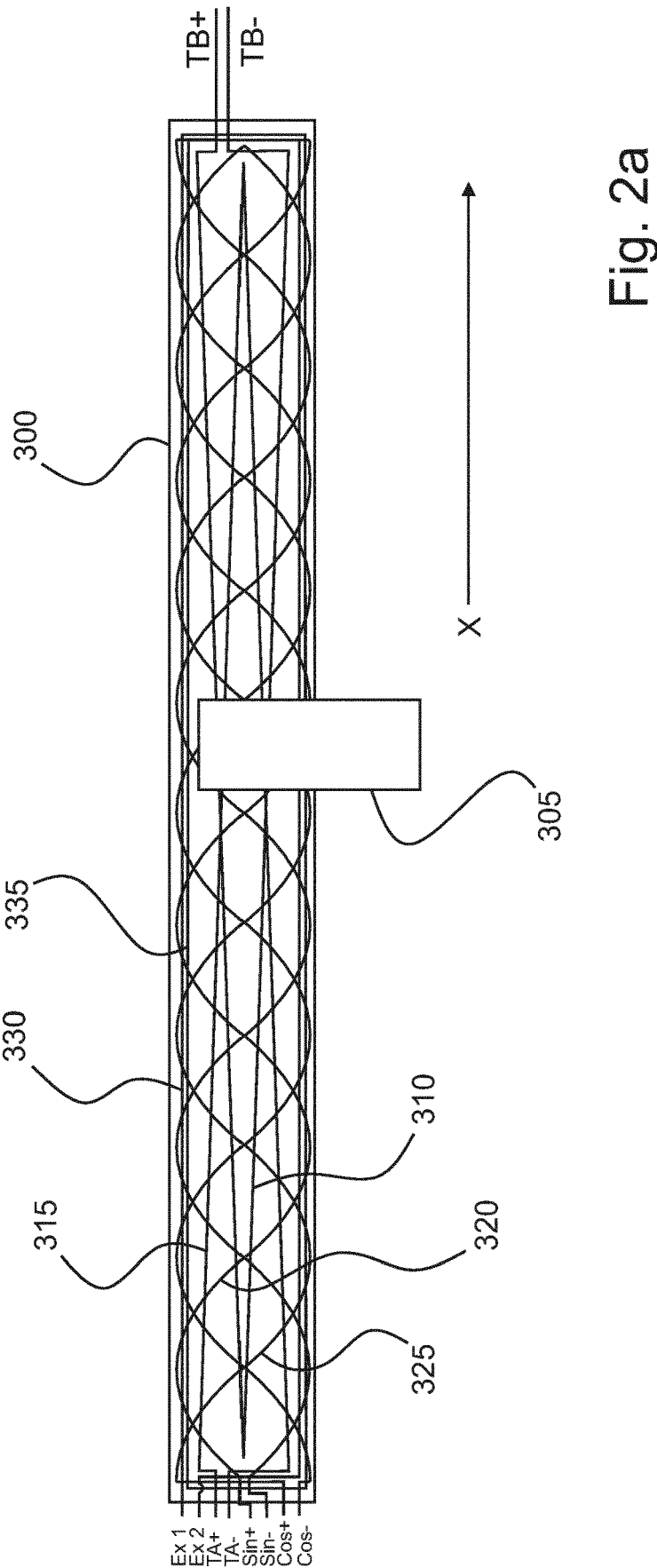
FIG. 2*a* schematically shows a principal structure, as lateral view, of a displacement sensor according to the invention and relevant here.

FIG. 2a shows an exemplary embodiment of an inductive displacement sensor according to the invention having an elongated support 300 on which a displaceable measuring head 305 produced from a ferritic material is arranged moveably in the longitudinal direction of the support 300. The measuring head 305 in turn has an inherently known resonant circuit (not shown here).

In contrast to the prior art, the displacement sensor shown in FIG. 2a in the present exemplary embodiment has two pairs of measuring loops 310, 315 and 320, 325.

The first measuring loop pair has two triangular measuring loops 310, 315 whose geometric shape changes respectively successively in the event of the measuring head 305 displacing longitudinally in such a way that the spacing of the two respective conductors varies perpendicularly to the displacement direction of the measuring head.

The displacement sensor additionally has two rectangular exciter loops 330, 335, by means of which the resonant circuit of the measuring head 305 can be excited by generating a magnetic flux in the resonant circuit. The two exciter loops 330, 335 are designed, in particular, in such a way that the magnetic flux penetrates at each point of the two measuring loops 310, 315.

The shown first measuring loop pair 310, 315 has a geometric shape in order to obtain a response, changing as linearly as possible along the displacement sensor, to a magnetic excitation. Thus, with the measuring loop 310 in the event of a movement of the measuring head 305 from left to right, the linear cohesion applies in the present depiction:

$$\text{Output value (resonant circuit)} = a^*x + b,$$

wherein x=position of the measuring head 305 in the longitudinal measuring direction x of the displacement sensor and a, b are constants that can be determined empirically.

The two measuring loops 310, 315 of the first measuring loop pair are formed symmetrically to each other and reflected in relation to each other. Thus, when the first measuring loop 310 generates an increasing output value, then the second measuring loop 315 generates a decreasing output value. The precise geometric shape and the position of the two measuring loops 310, 315 must here be chosen in such a way that the sum of the output values of the two measuring loops 310, 315 is constant.

The second measuring loop pair 320, 325 additionally provided in the exemplary embodiment shown here has a different geometric shape to the first measuring loop pair 310, 315, in order to issue its sinusoidal or cosinusoidal output value in response to a longitudinal or rotation displacing of the measuring head 305. The geometries of these two measuring loops 320, 325 are here identical. However, the first measuring loop 320 is in an x-position in such a way that the first measuring loop 320 issues a sinusoidal output value and the second measuring loop 325 a cosinusoidal output value, in response to a longitudinal or rotational displacing of the measuring head 305 in the x-direction shown. In case of the measurement loop pair 320, 325, the geometric shape should be chosen in such a way that the sum of the squares of the output values is constant.

It should be mentioned that, having the mentioned values on a constant level, an Automatic Gain Control (AGC) can be realized using a feedback loop. Such a feedback loop is highlighted in FIG. 3b.

In FIG. 2a, the electrical ports of the two exciter loops 330, 335 are labelled with "Ex1" and "Ex2". The electrical ports of the first triangular measuring loop 310 is labelled with TA+ and TA− and the ports of the second triangular measuring loop 315 with TB+ and TB−. The ports of the sinusoidal measuring loop 320 are labelled with Sin+ and Sin− and the ports of the cosinusoidal measuring loop 325 with Cos+ and Cos−.

The first measuring loop 320 and the second measuring loop 325 of the second measuring loop pair are phase shifted in relation to each other by a fixed value, namely by the value of 100 mm in the present exemplary embodiment. The corresponding period course of the two measuring loops 320, 325 is correspondingly repeated in the x-direction of the displacement sensor 300.

The coarse displacement of the measuring head 305 along the displacement sensor 300 in the x-direction shown can be determined by means of the first triangular measuring loop pair 310, 315, whereas the sinusoidal or cosinusoidal measuring loop pair 320, 325 issues the fine displacement of the measuring head 305. The segments of a sine period and a cosine period of the measuring loop pair 320, 325 are repeated periodically, wherein the period length is arbitrary, but can be in any range, preferably 100 mm. The actual displacement of the measuring head 305 is made up of the results of the coarse and the fine displacement.

Figure 4A:
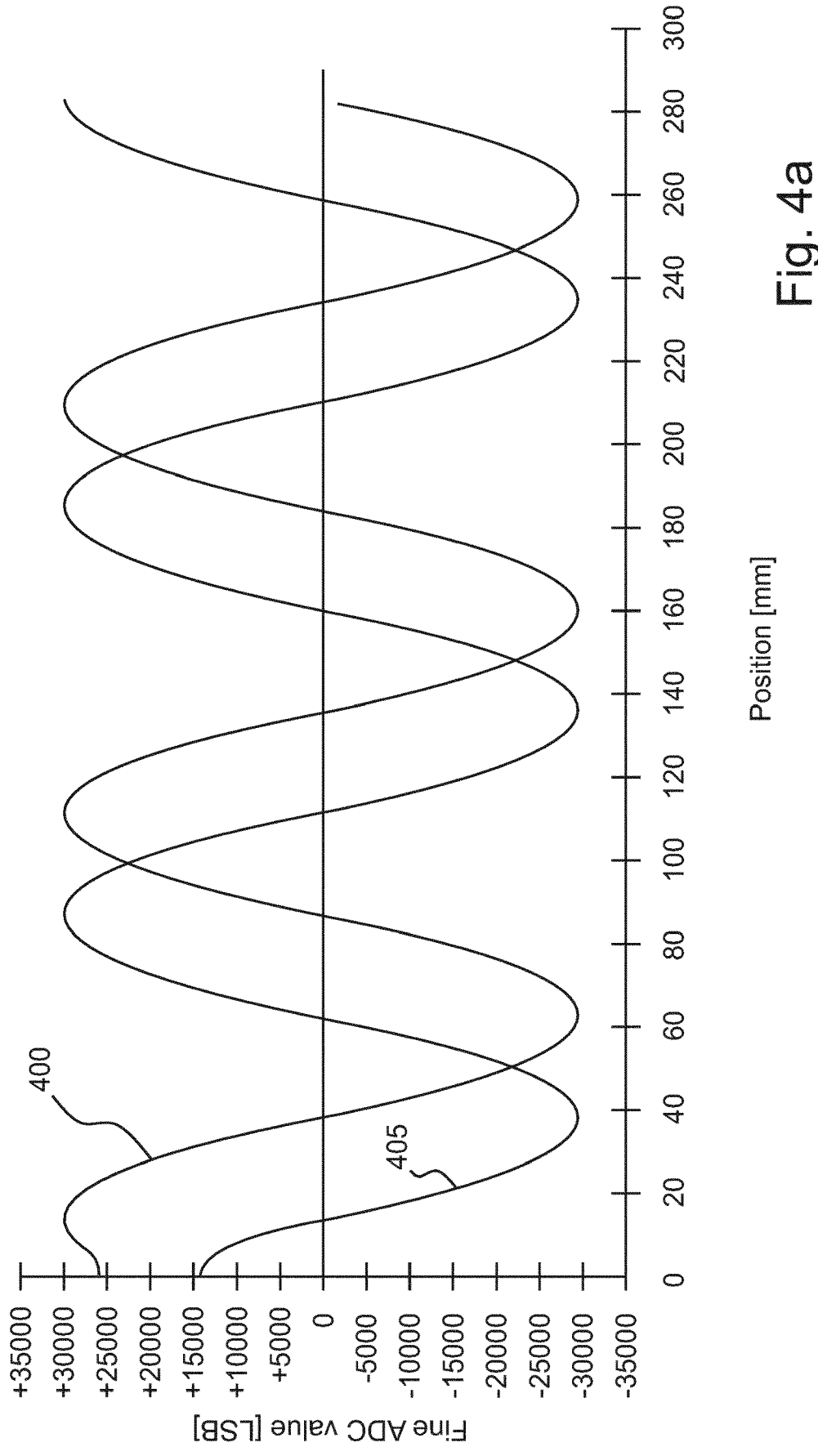
FIGS. 4*a, b* show signal amplitudes measured on measuring loops of a sinusoidal or cosinusoidal measuring loop pair (FIG. 4*a*) and on measuring loops of a triangular measuring loop pair (FIG. 4*b*)
Figure 4B:
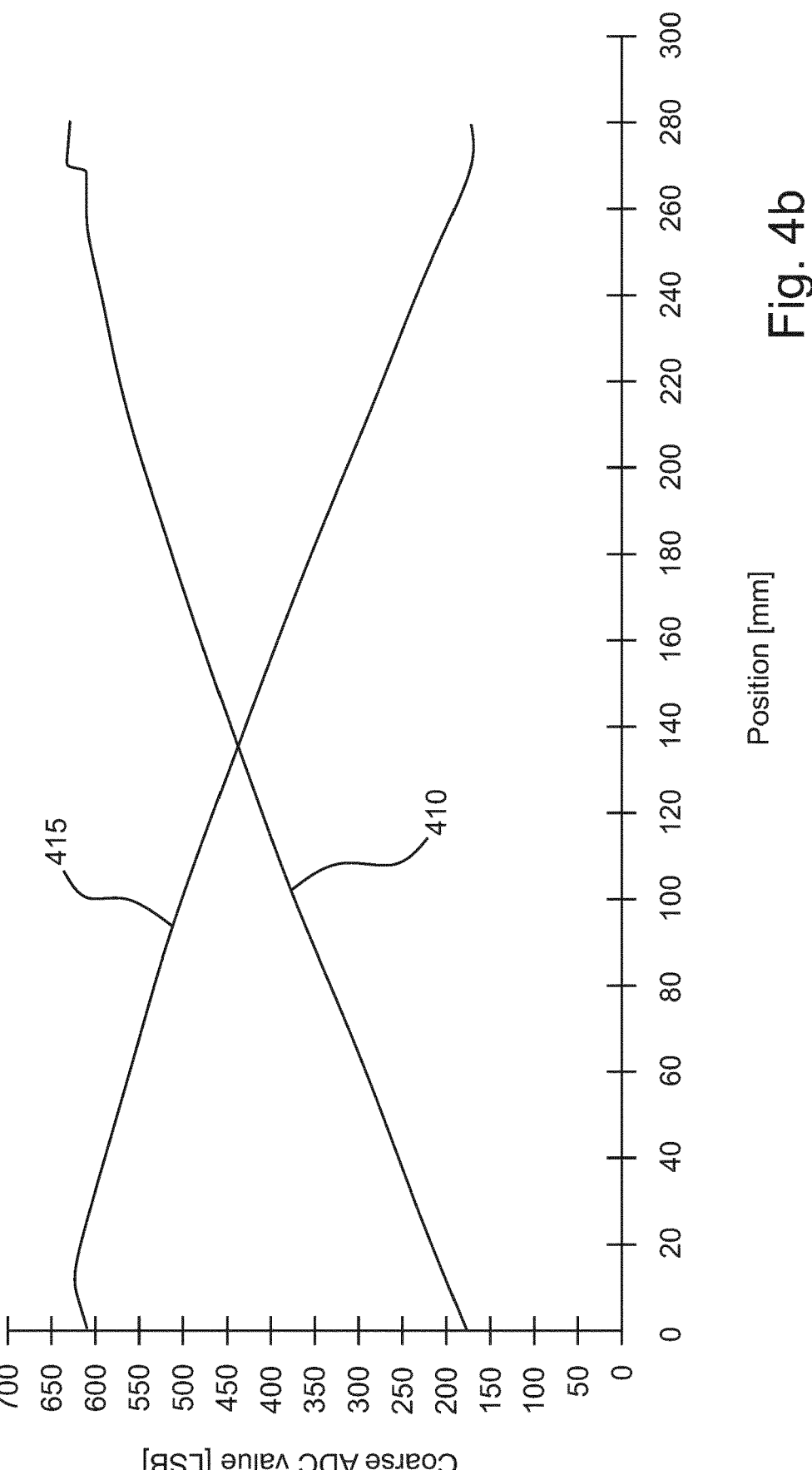

Corresponding exemplary measuring signals are shown in both FIGS. 4a and 4b. Thus, FIG. 4a shows measured signal amplitudes 400, 405 of the sinusoidal and cosinusoidal measuring loops 320, 325 depending on the position of the measuring head in the x-direction shown in FIG. 2a. The periodic signal courses lying relatively closely in the x-direction enable said determination of the fine displacement of the measuring head 305.

The measured signal amplitudes 410, 415 shown in FIG. 4b of the two triangular measuring loops 310, 315 depending on the position of the measuring head 305 enable only a rough determination of the value of the displacement of the measuring head 305 due to their relatively flat (i.e. non-periodic) course in the x-direction (in contrast to the signal courses in FIG. 4a).

Figure 2B:
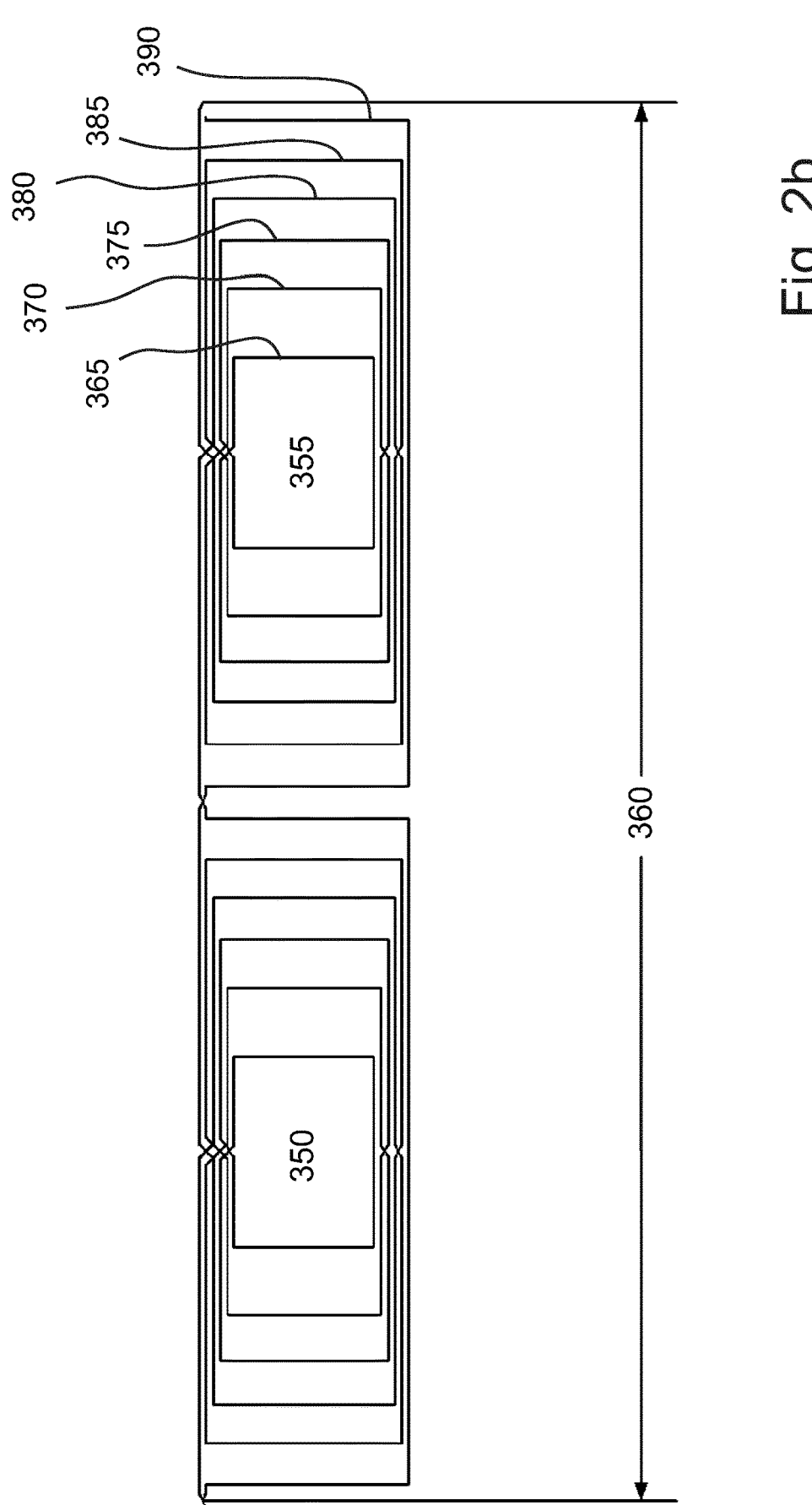
FIG. 2*b* schematically depicts one period of a digital Sin/Cos coil of a displacement sensor shown in FIG. 2*a;*

FIG. 2b shows one period 360 of a digital Sin/Cos coil of a displacement sensor shown in FIG. 2a. The period length, in the present example, is 100 mm. In particular, there are depicted the corresponding windings of the two coils, exemplary and in case of the Cos coil, the shown six windings 365, 370, 375, 380, 385 and 390.

Figure 2C:
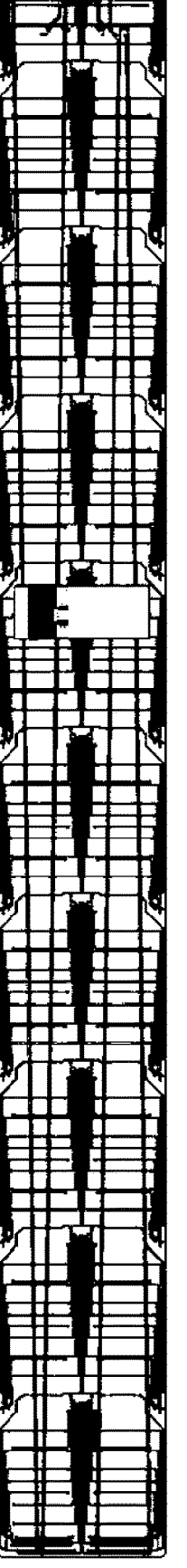
FIG. 2*c* schematically depicts a dual coil arrangement of a displacement sensor shown in FIG. 2*a;*

FIG. 2c shows a dual coil arrangement of a displacement sensor shown in FIG. 2a, where at least two exciter loops (330, 335) are provided, which are formed in such a way that the magnetic flux penetrates at every point of the respective magnetic loop (310, 315, 320, 325).

Figure 3A:
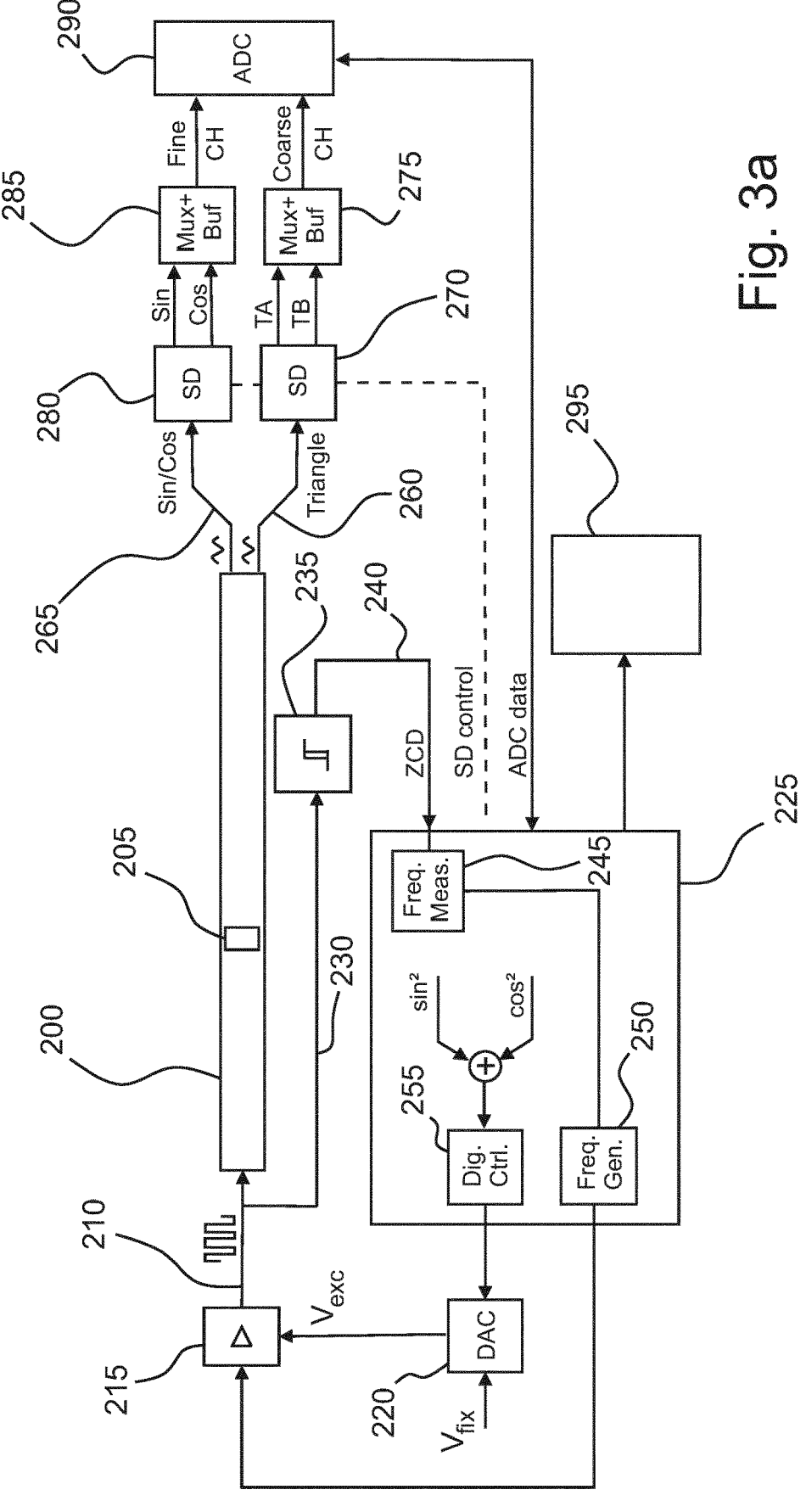
FIG. 3*a* shows an electronic control/evaluation unit for a displacement sensor according to the invention depicted in FIG. 2, by means of a block diagram.

FIG. 3a shows a block diagram of an electronic control or evaluation unit according to the invention for controlling a displacement sensor 200 shown in FIG. 2a and for evaluating the measuring signals issued by the displacement sensor.

The excitation of the two exciter loops 330, 335 shown in FIG. 2a is carried out by means of a controller 225, which provides an exciter voltage 210 by means of a digital to analogue converter (DAC) 220. In the present exemplary embodiment, the controller is formed as a programmable voltage source and sends so-called "burst" excitation signals 555 to the exciter loops 330, 335, namely with a previously set voltage level and a previously measured oscillator frequency.

The respective exciter loop 330, 335 generates oscillations in the resonant circuit (not shown) arranged on the measuring head 205. The thus oscillating resonant circuit in turn generates a signal in the two measuring loop pairs, i.e. both in the sinusoidal or cosinusoidal measuring loop pair 320, 325 and in the triangular measuring loop pair 310, 315.

The demodulation of the signals measured by means of the measuring loop pairs 310, 315 and 320, 325 is carried out by means of respective synchronous demodulators (SD circuits) 270, 280 working synchronously with one another. The two signals (the SIN/COS and the triangular signal) are rectified and demodulated by means of the two SD circuits 270, 280, while the excitation is inactive ("discontinuous" measuring principle). The output signals of the two SD circuits 270, 280 are respectively supplied to a demodulator/ capacitor (or "DC circuit") 275, 285, the output voltages of which are proportional to the current position of the measuring head 205. The output voltage of the first DC circuit 275 here corresponds to said coarse displacement of the measuring head 205 and the output voltage of the second DC circuit 285 of said fine displacement of the measuring head 205.

The calculation of the position of the measuring head 205 is carried out by the output voltages of the two DC circuits 275, 285 being supplied to one (or more) analogue to digital converter(s) (ADC) 290. The controller 225 reads the ADC 290 and calculates the current position value of the measuring head 205 according to the following equations:

The fine position of the measuring head 205 is calculated as follows:

$$posfine=lper/2\pi*tan^{-1}(sin/cos)$$

wherein "lper" represents the geometric periods of the sinusoidal or cosinusoidal measuring loops 320, 325, "sin" the output result of the sinusoidal measuring loop 320 and "cos" the output result of the cosinusoidal measuring loop.

On the other hand, the coarse position of the measuring head 205 is calculated as follows:

$$poscoarse=lnom*[(TA-TB)/(TA+TB)],$$

wherein "TA" and "TB" are the output results of the two triangular measuring loops 310, 315, and "lnom" represents the nominal length of the two triangular measuring loops 310, 315.

It should be noted that the value emerging here "poscoarse" of the coarse position of the measuring head 205 represents a ratiometric number, which corresponds to the actual length of the measuring loops, yet derives the length value only from the ratio of the two parameters (TA−TB) and (TA+TB) in relation to each other. By combining the two values "posfine" and "poscoarse", the actual absolute position of the measuring head 205 emerges. The controller 225 sends this result to an interface 295 chosen by the user, e.g. analogous, SSI, IO-link or any BUS system.

In the present exemplary embodiment, said control of the signal recognition is carried out by means of a programmable amplification 215. The measuring head 205 is here mounted floatingly, such that the height of the measuring head 205 can be changed. This height and lateral displacement has a great influence on the signal amplitude of the measuring loop pairs 310, 315 or 320, 325 and causes noise or resolution problems of the respective output signals 260, 265.

In order to achieve a high location resolution of the displacement sensor 200 or a corresponding low level of noise, the amplitudes of the two measuring loop signals 260, 265 must be held at as constant a signal level as possible. This can be achieved by means of the programmable amplification 215 which is implemented with a programmable voltage source (PVS). Here, the voltage level of the excitation driver of the PVS is set in such a way that a sufficient signal amplitude is achieved in the measuring loops 310, 315 or 320, 325. Yet the higher level of the excitation voltage 210 also means a higher signal amplitude of the two measuring loop signals 260, 265.

It is to be noted here that the number of "burst" excitation signals can alternatively also be changed in order to achieve the desired signal level. A corresponding alternative signal amplitude control can be evaluated by varying the excitation energy by changing the number of excitation periods. Because, when the PVS has reached its voltage limit, an increase of the excitation number extends the PVS limits. This alternative approach is particularly advantageous if the excitation coils have higher inductivity (e.g. long coil system).

The required excitation voltage level Vexc is generated by means of said DAC 220 and is calculated as $$Vfix*k=Vexc,$$

wherein "Vfix" is a fixed voltage, "k" is a value calculated by the controller and a function of sqrt(sin²+cos²), and wherein "sin" and "cos" represent the result terms of the sinusoidal or cosinusoidal measuring loop pair.

It should be noted here that, instead of "sin²+cos²", the sum value "TA+TB" can be used for simplification, wherein "TA" and "TB" represent the result terms of the triangular measuring loop pair 310, 315.

Said k-value can be used together with the result terms "sin" and "cos" for calculating the signal quality, namely according to the equation below:

$$signal\ quality=log_2[(\sqrt{sin^2+cos^2})/k].$$

The signal quality calculated in this way can be used to obtain a reliable warning and error signal. Here, the value of the signal quality calculated in this way has a linear correlation to the physical alignment of the measuring head 205.

The frequency of the oscillator is recorded by means of a frequency meter 245. The excitation signal 210 generated by a frequency generator 250 comprises one or more excitation impulses which are generated with a high frequency resolution on the same frequency as that of the resonant circuit arranged on the measuring head 205. This excitation is a forced excitation, wherein the frequency is measured cyclically by the controller 255 when the excitation is inactive. It is emphasized, as can be seen in FIG. 3a, that the above-mentioned signal quality is determined by means of the controller 255. The corresponding exciter signal is supplied 230 to a zero-crossing detector (ZCD) 235, wherein the period length of the ZCD 235 determines the period of the oscillator.

The excitation frequency is updated continuously, corresponding to the measured frequency, in order to compensate for the fluctuations of the resonant circuit. These fluctuations are caused by temperature changes, coupling changes between the exciter coil and the measuring head, aging, and/or by metal ridges on the active surface of the measuring head 205. In addition, the measured frequency must be filtered and averaged.

It is to be noted here that the described frequency measuring can also be used for safely recognising the measuring head, e.g. with the aid of a frequency sweep, wherein only valid (i.e. originated from patent applicant or compatible) measuring heads are accepted or assumed.

The ZCD 235 uses the signals of the exciter coils differentially in order to obtain comparator signals independent of position and temperature and in order to suppress signal noise as far as possible. In this way, the ZCD 235 has a low phase error.

The deviation, caused by the production, of the measuring heads is compensated for automatically by self-regulation, i.e. frequency adjustment and amplitude regulation of the exciter coil by PVS.

The evaluation of the two measuring signals 260, 265 issued by the displacement sensor 200 is carried out by means of the exemplary evaluation circuit depicted in FIG. 3a. Here, the two measuring signals 260, 265 are firstly supplied to the two synchronous demodulators (SD) 270, 280 working in parallel and synchronously to each other, by means of which the measuring signals are initially decoded or demodulated in terms of the triangular characteristic predetermined by the respective measuring loop pairs 310, 315 and 320, 325 and the sinusoidal or cosinusoidal characteristic also predetermined.

It is to be noted that the evaluation circuit does not have a preamplifier in this exemplary embodiment, in order to keep the phase error as small as possible when evaluating the two signals 260, 265.

The two correspondingly, by the two synchronous demodulators (SD) 270, 280 provided, decoded signals are finally supplied to one (or more) AD converter(s) 290, yet multiplexed by means of two demodulators/capacitors 275, 285, in order to obtain a consistent channel chain for the different measuring signals 260, 265, whereby linearity and temperature errors are reduced.

It is to be noted here that the circuit frequency of the evaluation circuit 270 to 290 shown in FIG. 3a can be set by the high-resolution frequency measuring module 245.

In the present exemplary embodiment, the two synchronous modulators (SD) 270, 280 are operated in the following two operating modes (a. and b.):

a. The two synchronous demodulators 270, 280 are controlled together by the zero-crossing detector (ZCD) 235, whereby a self-synchronisation between these emerges;

b. The two synchronous demodulators 270, 280 are controlled together by means of the controller 225 on the basis of the measured frequencies 260, 265, whereby a forced synchronisation between these emerges.

The self-synchronisation (operating mode a.) enables a higher signal level, wherein the forced synchronisation (operating mode b.) enables a higher level of EMC suppression. In order to achieve the lowest signal noise, the two synchronous demodulators 270, 280 automatically switch between the two operating modes a. and b. in the present exemplary embodiment.

By suitably choosing the frequency of the resonant circuit, the measuring rate can be changed as needed, in order to achieve a higher update rate or better stability. Here, a frequency of 100 kHz has emerged as a good compromise.

In order to achieve a high measuring rate >10 kHz, a "field-programmable gate-array" (FPGA) can be used in order to be able to implement the measuring events described and the evaluation of the measuring results in real time in parallel.

By using said symmetrical coil arrangements and the correspondingly symmetrically operated demodulators 270, 280, a very low "jitter" value ($6\sigma \leq 0.4$ μm) and a very high measuring resolution (<0.1 μm) can be achieved when determining the position of the measuring head.

In comparison to the displacement sensor known in the prior art according to the printed publication US 2003/206 007 A1, the following differences thus emerge:

The measuring loop arrangement according to the invention has at least one additional sinusoidal or cosinusoidal measuring loop pair for additional, fine-resolution measuring of the position of the measuring head;

The position resolution of the displacement sensor is independent of the length of its longitudinal extension;

The mounting of the measuring head is floating; More excitation impulses can be present in a measuring cycle; The excitation feedback is carried out via sin/cos coils;

The output value of the evaluation circuit is made up of the measuring signals of the triangular and the sinusoidal or cosinusoidal measuring loop pair by means of an AD converter and a digital circuit.

Figure 3B:
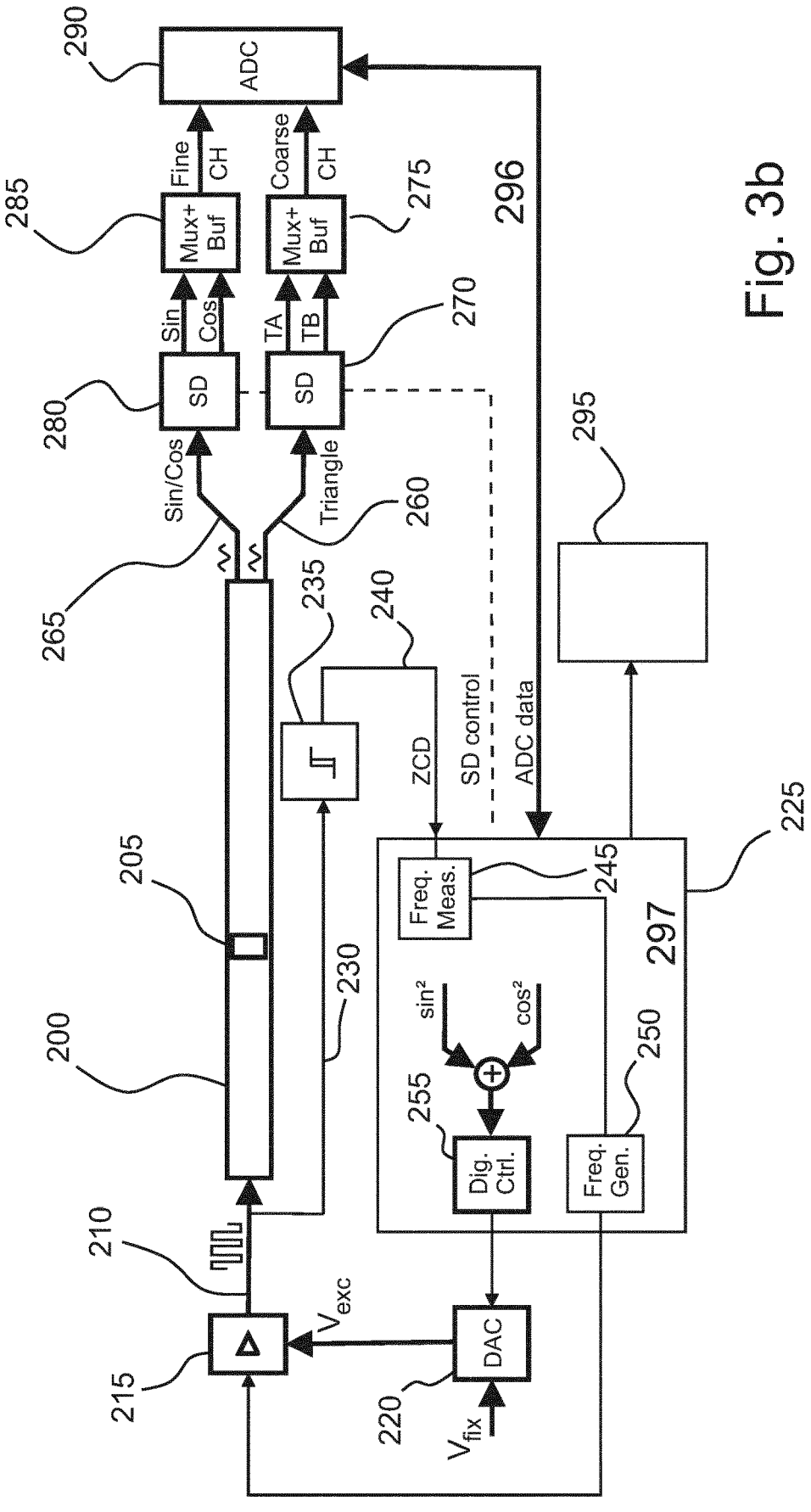
FIG. 3*b* shows another view of an electronic control/evaluation unit depicted in FIG. 3*a,* where the signal path of a first feedback loop for the signal amplitude is illustrated, or pointed out respectively.
Figure 3C:
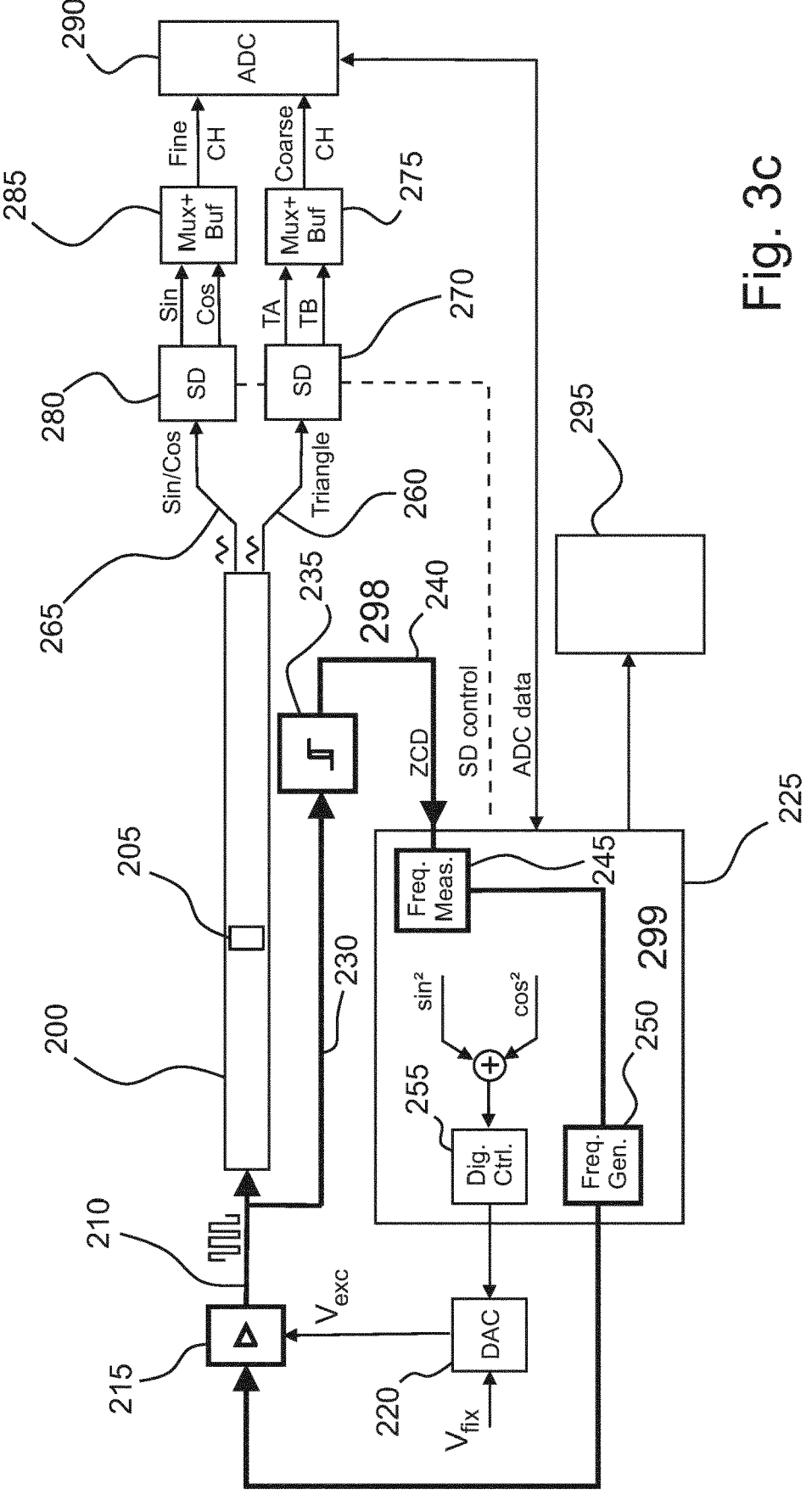
FIG. 3*c* shows another view of an electronic control/evaluation unit depicted in FIG. 3*a,* where the signal path of a second feedback loop for the frequency is illustrated, or pointed out respectively.

FIG. 3b shows another view of an electronic control or evaluation unit depicted in FIG. 3a, where the signal path 296 of a first feedback loop concerning the signal amplitude 297 is pointed out or highlighted respectively. Further, FIG. 3c shows a similar view of an electronic control/evaluation unit as in FIG. 3b, but where the signal path 298 of a second feedback loop for the frequency 299 is pointed out as well.

Figure 5A:
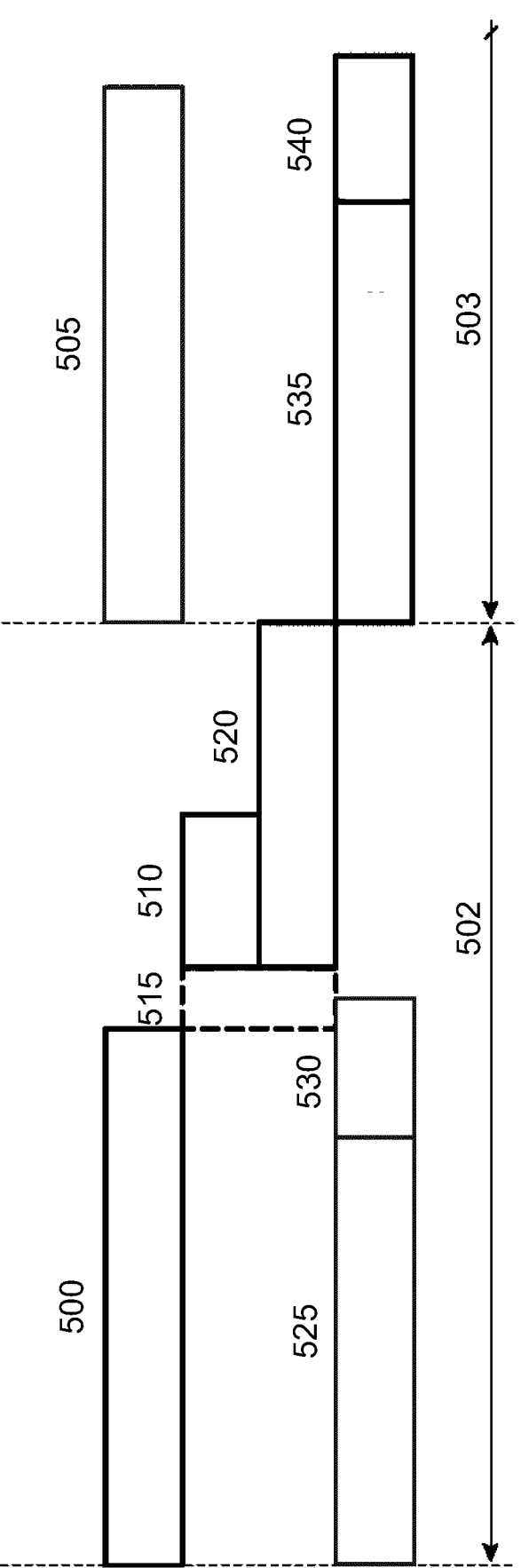
FIG. 5*a* schematically shows the underlying principle of a discontinuous measurement method or process, to be performed by an electronic control/evaluation unit depicted in FIG. 3*a;*
Figure 5B:
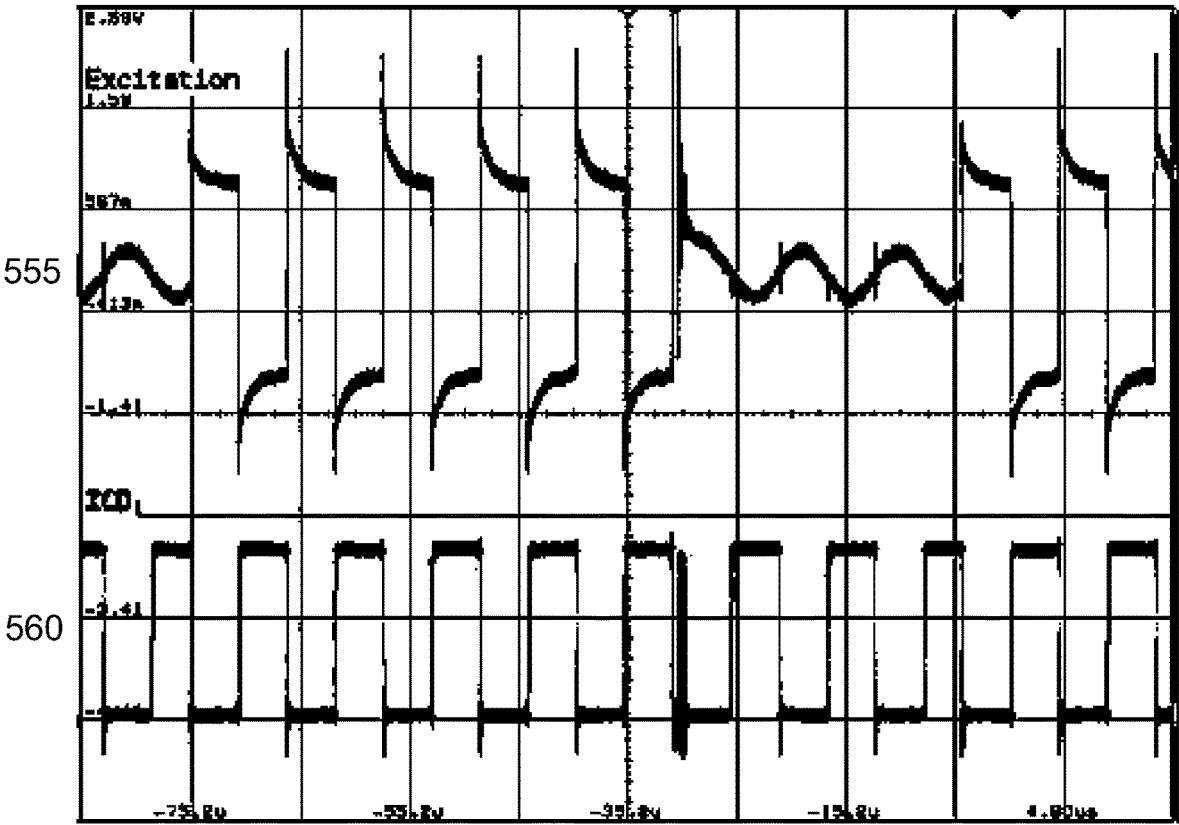
FIG. 5*b* shows typical burst excitation signals, being generated by an electronic control/evaluation unit depicted in FIG. 3*a.*

Now referring to FIGS. 5a and 5b, the "burst" excitation signals described by way of FIG. 2a and the discontinuous measurement principle are described in more detail.

Hereby, FIG. 5a illustrates a discontinuous measurement method or process by way of a timing diagram, in particular showing two consecutive measurement cycles, namely measurement cycle n 502 and measurement cycle n+1 503. The shown process steps are performed by an electronic control/evaluation unit depicted in FIG. 3a.

During the first measurement cycle n 502, a first burst excitation signal (according to reference numeral 210 shown in FIG. 3a) is generated by a first excitation 500 and during the second measurement cycle n+1 503 a second burst excitation signal is generated by a following second excitation 505. During the first excitation 500, the previously (i.e. during the previous measurement cycle n−1 which is not highlighted in FIG. 5a) demodulated signals are being measured 525 using the ADC 290 and the position information is calculated in calculation step 530 by the controller 225.

Based on the first excitation 500, as described in connection with FIG. 3a, the signal of the excitation coil is supplied 230 to a zero-crossing detector (ZCD) 235, when the excitation is inactive, wherein the period length of the ZCD 235 determines the period of an above-described oscillator.

After a short inhibit time 515 after the first burst excitation signal 500, parallel to the demodulation step 520, a frequency measurement 510 is performed by the frequency meter 245 shown in FIG. 3a and as a part of the frequency feedback loop 240 which is also depicted in FIG. 3c by reference numeral 298.

During the second measurement cycle n+1 503, based on the second excitation 505, the signal of the excitation coil is supplied 230 also to the ZCD 235. After the demodulation step 520 the demodulated signals are being measured 535 using the ADC 290 and the position information is calculated in calculation step 540 by the controller 225.

Finally FIG. 5b, in the upper part, shows typical burst excitation signals 555 and, in the lower part, shows typical corresponding response signals 560 being output by the ZCD 235 and being delivered to the frequency meter 245 via the frequency feedback loop 240 shown in FIG. 3a and being highlighted in FIG. 3c, which are measured by an electronic control/evaluation unit depicted in FIG. 3a.

The invention claimed is:
1. Inductive displacement sensor, said sensor comprising:
a magnetically permeable measuring head arranged displaceably and/or rotatably on an elongated support,
at least one measuring loop arranged on the elongated support whose geometric shape changes in response to a longitudinal/rotational displacement of the magnetically permeable measuring head along the elongated support, and
at least one exciter loop arranged on the elongated support, by means of which exciter loop a magnetic flux can be generated in the magnetically permeable measuring head,
at least two measuring loops are provided, at least one first measuring loop is designed geometrically in such a way that a response, changing essentially linearly along the inductive displacement sensor, to a magnetic excitation of the magnetically permeable measuring head emerges with a longitudinal/rotation displacement of the magnetically permeable measuring head along the elongated support, and at least one second measuring loop is formed geometrically in such a way that a periodically changing response to a magnetic excitation of the magnetically permeable measuring head emerges with a longitudinal/rotational displacement of the magnetically permeable measuring head along the elongated support,
wherein at least two measuring loop pairs are provided, a at least one first measuring loop pair has at least two triangular measuring loops arranged symmetrically to one another and a at least one second measuring loop pair has at least two measuring loops formed to be sinusoidal or co-sinusoidal, and
wherein a geometric shape and a position of the measuring loops of the at least one first measuring loop pair and of the measuring loops of the at least one second measuring loop pair are chosen in such a way that a sum of output values of the measuring loops of the first measuring loop pair is constant and that a sum of squares of output values of the measuring loops of the second measuring loop pair is substantially constant.
2. The displacement sensor according to claim 1, wherein the at least one first measuring loop is formed triangularly along the support and the at least one second measuring loop is formed to be sinusoidal and/or co-sinusoidal along the support.
3. The displacement sensor according to claim 2, wherein at least two triangular measuring loops are arranged in mirror image to each other.
4. The displacement sensor according to claim 2, wherein the at least one first measuring loop and the at least one second measuring loop of the second measuring loop pair are arranged phase shifted in relation to each other by a predetermined phase value.
5. The displacement sensor according to claim 4, wherein segments of a sinusoidal or co-sinusoidal period of the at least one second measuring loop pair are periodically repeated, wherein a period length is arbitrary and can be in any range, preferably 100 mm.
6. The displacement sensor according to claim 1, having an automatic gain control, based on a feedback loop.
7. The displacement sensor according to claim 1, wherein at least two exciter loops are formed in such a way that the magnetic flux penetrates at every point of a respective magnetic loop.
8. The displacement sensor according to claim 1, wherein a coarse displacement of the magnetically permeable measuring head along the elongated support is determined by means of the first measuring loop pair, and a fine displacement of the magnetically permeable measuring head along the elongated support is determined by means of the second measuring loop pair.
9. The displacement sensor according to claim 8, wherein an actual displacement of the magnetically permeable measuring head is determined from results of the coarse displacement and the fine displacement.
10. A control/evaluation unit for operating an inductive displacement sensor, said unit comprising:
a magnetically permeable measuring head arranged displaceably and/or rotatably on an elongated support,
at least one measuring loop arranged on the elongated support whose geometric shape changes in response to a longitudinal/rotational displacement of the magnetically permeable measuring head along the elongated support,
at least one exciter loop arranged on the elongated support, by means of which exciter loop a magnetic flux can be generated in the magnetically permeable measuring head,
at least two measuring loops are provided, wherein at least one first measuring loop is designed geometrically in such a way that a response, changing essentially linearly along the inductive displacement sensor, to a magnetic excitation of the magnetically permeable measuring head emerges with a longitudinal/rotation displacement of the magnetically permeable measuring head along the elongated support, and wherein at least one second measuring loop is formed geometrically in such a way that a periodically changing response to a magnetic excitation of the magnetically permeable measuring head emerges with a longitudinal/rotational displacement of the magnetically permeable measuring head along the elongated support,
a controller for generating an exciter voltage for exciting at least two exciter loops by means of a digital to analogue converter and by at least two demodulators for decoding the measuring signals measured by means of the at least two measuring loops, wherein the at least two demodulators are formed as synchronous demodulators working synchronously to each other, by means of which the at least two measuring signals are decoded, and wherein the controller is formed as a programmable voltage source.

11. The control/evaluation unit according to claim 10, including a first feedback loop for a signal amplitude.

12. The control/evaluation unit according to claim 10 wherein, based on a measured signal amplitude and based on a set excitation level, a signal quality is calculated which is linearly correlated with a physical alignment of the magnetically permeable measuring head of the inductive displacement sensor.

13. The control/evaluation unit according to claim 10, having a second feedback loop for a signal frequency.

14. The control/evaluation unit according to claim 10, including a discontinuous signal measurement process, wherein the controller sends excitation signals to the at least two exciter loops, with a voltage level set in advance and an oscillator frequency measured in advance.

15. The control/evaluation unit according to claim 12, wherein output signals of the at least two demodulators are supplied to at least two circuits respectively, output voltages of which are proportional to a current position of the magnetically permeable measuring head, wherein an output voltage of a first of the at least two circuits corresponds to a coarse displacement of the magnetically permeable measuring head and an output voltage of a second of the at least two circuits corresponds to a fine displacement of the magnetically permeable measuring head.

16. The control/evaluation unit according to claim 10, wherein by means of at least two circuits, decoded signals from the at least two demodulators are multiplexed and supplied to an analogue to digital converter in order to obtain a consistent channel chain for the at least two measuring signals.

* * * * *